July 10, 1928.
A. G. FORSTER
1,676,537
VISOR ATTACHMENT FOR MOTOR VEHICLES
Filed Oct. 19, 1925
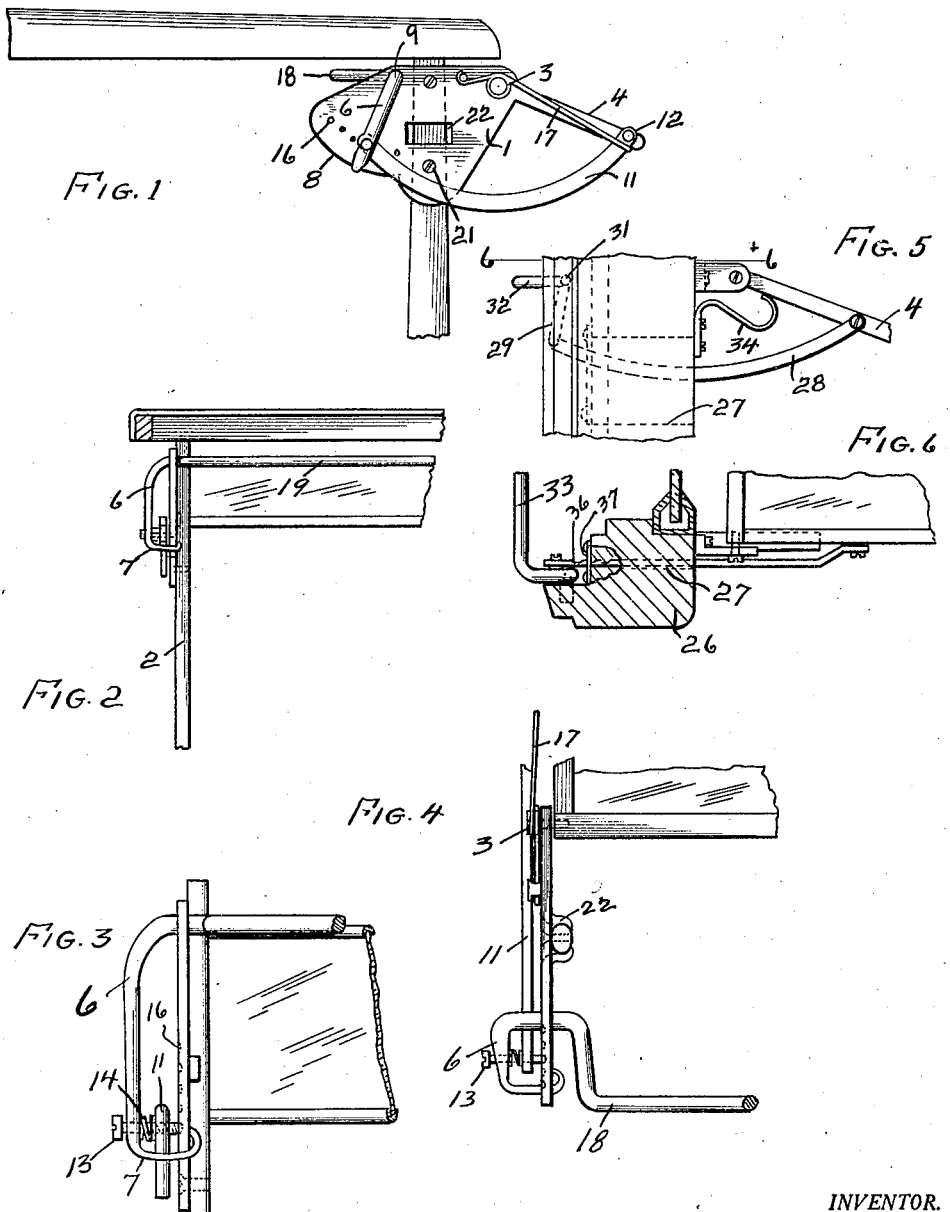
INVENTOR.
ARTHUR G. FORSTER
BY
Harry C. Schweder
ATTORNEYS.

Patented July 10, 1928.

1,676,537

UNITED STATES PATENT OFFICE.

ARTHUR G. FORSTER, OF OAKLAND, CALIFORNIA.

VISOR ATTACHMENT FOR MOTOR VEHICLES.

Application filed October 19, 1925. Serial No. 63,296.

The present invention relates to improvements in visor attachments for motor vehicles and its particular object is to provide an attachment by means of which a visor positioned in front of the windshield may be readily manipulated by means of operating arms disposed rearwardly of the windshield. A further object of this invention is to provide means in connection with the visor operating mechanism for allowing the visor to be set in any one of a number of different positions. A further object of the invention is to provide an operating mechanism for the visor of the character described that may be readily employed for closed as well as open cars.

Further objects and advantages of my device will appear as the specification proceeds.

The preferred form of my invention is illustrated in the accompanying drawing in which:

Figure 1 shows a side view of my mechanism,

Figure 2 is a rear elevation of the same.

Figure 3 is a fragmentary rear elevation on an enlarged scale.

Figure 4 is a top plan view of a portion of the mechanism.

Figure 5 is a side view of a modified arrangement adapted for use with a closed car.

Figure 6 is a horizontal section taken along line 6—6 of Figure 5.

While I have shown only the preferred form of my invention, it should be understood that various changes or modifications may be made within the scope of the claims hereto attached without departing from the spirit of the invention.

In carrying out my invention I secure two plates 1 which are preferably formed in the manner shown in Figure 1 on opposite sides of the two windshield posts 2 in such a manner that the plates are parallel to one another and project forwardly of the posts and the windshield as well as rearwardly. Between the forward projections of the two plates is pivotally supported, as shown at 3, the visor 4 which latter may be made of any suitable material and may be made of any suitable form and color. In the rear section of each plate is pivoted an arm 6 so as to swing in a plane parallel to the plate and the arm is curved as shown at 7 so as to reach around the lower edge 8 of the plate which latter for a certain distance is made to describe a circle around the axis 9 of the arm pivot. The end of each arm is connected to the end of the visor by means of a link 11 which latter is pivoted to the visor as shown at 12 and secured to the arm 6 in the manner shown in detail in Figure 3, by means of a bolt 13 extending through the arm with freedom of sliding motion and threaded into the link 11 while a spring 14 bearing on the arm forces the link 11 and the bolt 13 toward the plate 1 so as to engage the extreme end of the bolt 13 with one of the recesses 16 provided in the plate in peripheral relation relative to the axis 9. This arrangement causes the arm when advanced over the plate to stop at each of the recesses 16 and to offer increased resistance to its removal from said point.

The link 11 may be of any suitable form but is preferably made in the form of an arc of a circle in the manner shown in Figure 1. A spring 17 normally tends to maintain the visor in a raised position.

For manipulating the arms 6 I provide projections 18 extending from the pivot to the said arms and arranged at an angle to the latter, the two projections being interconnected by means of a rod 19 which latter serves to synchronize the movements of the two projections 18 and through the same of the two arms 6.

The two plates may be secured to the posts in any suitable manner as by the screws 21 and in order to secure a very rigid hold of the plates on the posts a central portion 22 may be forced out of the plane of the plate to provide two co-operating lips 23 adapted to be folded over opposite sides of each post.

The manner of operating the device will be readily understood from the foregoing description.

To raise the visor it is only necessary to operate the arms 6 by means of the projections 18 or the rod 19 connecting the same and the locking mechanism shown in Figure 3 will hold the arms 6 whenever the operator wishes to arrest the same, the resistance offered by the spring 14 being sufficiently strong to hold the visor 4 in any desired position but not being strong enough to resist positive action on the part of the driver. The spring 17 normally tends to press the visor upwardly and assists the driver in raising the same.

In Figures 5 and 6 is shown a modified arrangement adapted to be used for a closed car. In this form the side plates are done away with and the corner posts 26 provided with a slot 27 adapted for slidably receiving the links 28 corresponding to the links 11 of Figure 1, the front ends of which are pivoted to the visor 4 while the rear of each link 28 is fastened to one arm 29 of a bell crank lever pivoted as shown at 31. The two other arms 32 of the bell crank lever are connected by the transverse rod 33 in a manner similar to that previously described. A spring 34 is disposed so as to normally force the visor upwardly and the link 27 is toothed as shown at 36, the teeth being adapted for engagement with one edge of a plate 37 through which the link 27 passes, this locking engagement opposing the tendency of the spring 34 to raise the visor. When changing the position of the visor the operator presses slightly on the arm 29 of the bell crank lever so as to release the teeth 36.

Having described my invention, I claim:—

1. In a motor vehicle the combination of a windshield, plates supported on opposite sides thereof to project forwardly and rearwardly of the windshield, a visor pivoted between the plates forwardly of the windshield and means pivoted between the plates rearwardly of the windshield for operating the visor, the latter means having means associated therewith tending to arrest the same at predetermined points during the continual movement of said visor operating means.

2. In a motor vehicle the combination of a windshield, plates supported on opposite sides thereof to project forwardly and rearwardly of the windshield, a visor pivoted between the plates forwardly of the windshield, arms pivoted to the plates rearwardly of the windshield and links connecting the free ends of the arms with the free end of the visor, whereby the latter may be operated by manipulating the former, the arms having projections extending at an angle thereto by means of which they may be manipulated and the projections being interconnected to synchronize the motions of the same.

3. In a motor vehicle the combination of a windshield, plates supported on opposite sides of the same so as to project forwardly and rearwardly thereof, a visor pivoted between the plates forwardly of the windshield, arms pivoted in the plates rearwardly of the windshield and an operative connection between the visor and the arms for transmitting motion from one to the other, the arms extending around the edges of the plates with curved ends thereof to prevent the same from bending away from the plates.

4. In a motor vehicle the combination of a windshield, plates supported on opposite sides of the same so as to project forwardly and rearwardly thereof, a visor pivoted between the plates forwardly of the windshield arms pivoted to the plates rearwardly of the windshield and an operative connection between the visor and the arms for transmitting motion from one to the other, the arms extending around the edges of the plates with the curved ends thereof to prevent the same from bending away from the plates and having bolts slidable therein for engagement with recesses in the plate in combination with spring means for forcing the bolts into the recesses for arresting the motion of the arms at predetermined points.

5. In a device of the type described, a visor moving arm, a support for rotatively carrying said arm, and having recesses therein, and a spring pressed catch adapted to enter any one of said recesses for holding said arm in adjusted position, said arm having a portion thereof curved around said support and bearing against the opposite side of said support.

In testimony whereof I affix my signature.

ARTHUR G. FORSTER.